July 21, 1953  G. H. ANDERSON  2,646,294
DISCONNECT COUPLING
Filed Dec. 27, 1949
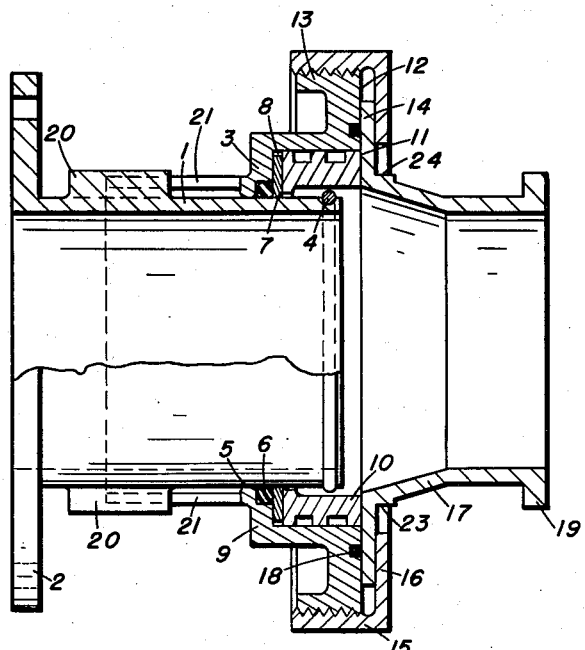
FIG. 1
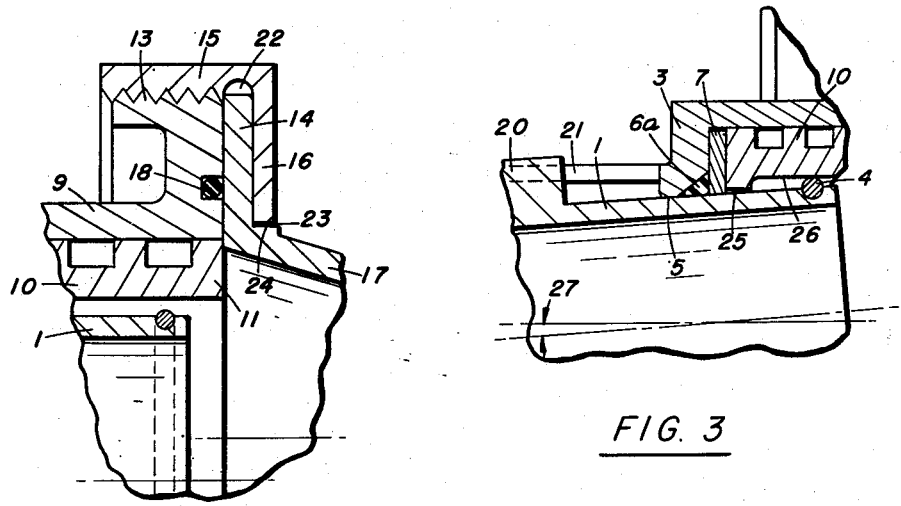
FIG. 2
FIG. 3
INVENTOR.
GORDON H. ANDERSON
BY William R. Lane
ATTORNEY Patented July 21, 1953

2,646,294

UNITED STATES PATENT OFFICE 2,646,294

DISCONNECT COUPLING

Gordon H. Anderson, Inglewood, Calif., assignor to North American Aviation, Inc.

Application December 27, 1949, Serial No. 135,069

1 Claim. (Cl. 285—127)

The subject invention comprises a variable tolerance disconnect unit.

It is an object of the present invention to provide a coupling means suitable for connecting tanks having misaligned openings.

It is a further object of this invention to provide a coupling which may be readily utilized in the joining of conduits, fluid conductors, tubing, pipes, and the like.

To facilitate such connection it is another object of the present invention to provide a coupling having means for adjusting the parts thereof longitudinally with respect to each other while accommodating for transverse or angular misalignment of the members to be connected.

It is a further object of the present invention to provide all of the foregoing features by means which are simple to manufacture, quickly installed and adjusted, light in weight, and serviceable in operation.

Other objects of invention will become apparent from the following description taken in connection with the accompanying drawings, in which Fig. 1 is a section taken upon the longitudinal axis of the coupling illustrating the concentric assembled relationship of the several parts, Fig. 2 is an enlarged detail illustrating the extent of the transverse adjustment, and Fig. 3 is an enlarged detail showing a modified form of seal permitting a substantial degree of angular misalignment between the opposite ends of the fitting assembly.

Referring to the arrangement shown in Fig. 1 the subject coupling comprises a tubular member 1 having a flange at 2 for attachment by appropriate means to a tank body or mating flange. The tubular member 1 is arranged in sliding engagement within a body member 3. The members 1 and 3 are retained in assembled relationship by means of a snap ring type of lock indicated at 4, which is installed subsequent to the interfitting of the two aforementioned members. The outer surface of the member 1 is in contact with a rounded shoulder 5 at the inner edge of the member 3 and an annular ring type seal is provided at 6 to prevent leakage between the members 1 and 3. A washer 7 closely surrounds the outer surface of the member 1 serving as a back-up plate for the seal 6. Clearance is provided between the outer edge of the member 7 and the inner surface of the circumferential recess 8 in the enlarged portion 9 of the member 3. A short cylindrical spacer 10 bears against the back-up plate 7, the opposite end 11 coinciding with the face 12 of the return flange 13 of the member 3. A flanged face 14 of tubular member 17 in turn engages the faces 11 and 12 and by means of a ring nut 15 which threadedly engages the portion 13 serves to compress the seal 6 through the axial pressure exerted through the members 10 and 7. The inturned flange 16 of the ring nut 15 engages the flange 14 of the member 17 and a seal 18 is provided within the portion 13 to seal the surface 12.

Axial adjustment of the unit is accomplished by releasing the clamping pressure of the ring nut 15 which reduces the pressure on the seal member 6 sufficiently to permit the inner member 1 to be moved axially to permit longitudinal adjustment. The member 1 is provided with a pair of lugs 20 which engage slotted portions 21 in the extending sleeve of the member 3 to prevent rotation between these members. Longitudinal adjustment is limited in extension by the lock ring 4 engaging the member 10 or in contraction by the lug 20 against the member 3. With the length of the unit adjusted the respective elements will be retained in sealed relationship by tightening the ring nut 15 which compresses the seals sufficiently to prevent leakage.

Misalignment transversely between the respective flanges 2 and 19 is readily accommodated as indicated in Fig. 2. By releasinng the clamping tension of the ring nut 15, the flange 14 may be displaced within the area provided by the flange 16 of the ring nut, movement being limited by the outer clearance provided at 22 and by engagement of the inner edge 23 of the ring nut with the shoulder 24 of the member 17. This adjustment may be in either a transverse or a vertical plane or any combination thereof. Tightening of the ring nut 15 upon completion of the desired adjustment effects a compression of the seal 18 and through contact with the face 11 of the member 10 serves to secure the previously obtained longitudinal adjustment.

Angular adjustment may also be obtained in the subject arrangement through the ability of the tubular member 1 to pivot about the rounded shoulder 5 of the body 3. This movement is limited by contact of the inner end of member 1 with the inner surface 25 of the member 10 and by the ability of the member 7 to be displaced axially or by the contact of the retainer ring 4 with the under surface 26 of the member 10. A modified type of seal, as shown in Fig. 3, may be substituted to facilitate the design of the several elements to obtain a maximum degree of misalignment as indicated at 27. This angular misalignment again may be accommodated in either of two planes or any combination thereof.

Although the invention has been described and illustrated in detail, it is to be clearly understood that the same is by way of illustration and example only and is not to be taken by way of limitation, the spirit and scope of this invention being limited only by the terms of the appended claim.

I claim:

A coupling comprising a first tubular member; an annular body member around an end portion of said first tubular member, said body member having a rounded inner edge adjacent said first tubular member whereby said tubular member is tiltable about said edge and axially movable relative thereto, said body member having a portion spaced from said tubular member thereby defining a circumferential recess, and further having a flat radial face portion; a second tubular member, said second tubular member having a flat radial end flange adapted to abuttingly engage said body member face with freedom for radial movement relative thereto; releasable means for holding said flange in engagement with said face in any relative radial position; a first sealing means interposed between said flat radial face portion and said second tubular member end flange; a second sealing means interposed between said body member and said first tubular member; spacer means in said circumferential recess interposed between said second tubular member end flange and said second sealing means for urging said second sealing means against said first tubular member and said body member when said second tubular member is held against said body member flange; and lock means at the end of said first tubular member for preventing removal of said body member therefrom.

GORDON H. ANDERSON.

References Cited in the file of this patent

UNITED STATES PATENTS

| Number | Name | Date |
|---|---|---|
| 870,200 | Sheckler | Nov. 5, 1907 |
| 1,319,457 | Bogart | Oct. 21, 1919 |
| 1,632,042 | Price et al. | June 14, 1927 |
| 1,926,422 | Armbruster | Sept. 12, 1933 |
| 2,318,428 | Skinner | May 4, 1943 |
| 2,422,597 | Stewart | June 17, 1947 |
| 2,432,592 | Stecher et al. | Dec. 16, 1947 |
| 2,511,495 | Crot | June 30, 1950 |

FOREIGN PATENTS

| Number | Country | Date |
|---|---|---|
| 764,802 | France | May 29, 1934 |